United States Patent [19]

Chernikhov et al.

[11] 4,229,560

[45] Oct. 21, 1980

[54] THERMOSTABLE NITROGEN CONTAINING HETEROCYCLIC POLYMERS AND PROCESS FOR PRODUCING

[76] Inventors: Alexei Y. Chernikhov, prospekt Vernadskogo, 93, kv. 64; Mikhail N. Yakovlev, ulitsa Amurskaya, 8, kv. 93, both of Moscow; Valentina B. Lysova, ulitsa Juzhnaya, 22, kv. 59, Moskovskaya oblast, Pavlovsky posad; Evgeny L. Gefter, B. Dorogomilovskaya ulitsa, 56, kv. 60; Nina N. Shmagina, ulitsa Moldogulovoi, 8, korpus 1, kv. 66, both of Moscow, all of U.S.S.R.

[21] Appl. No.: 910,298

[22] Filed: May 30, 1978

[51] Int. Cl.$^2$ ............................................. C08G 73/06
[52] U.S. Cl. ...................... 528/4; 528/128;
528/168; 525/452; 528/172; 528/205; 525/453;
528/210; 528/211; 525/459; 528/220; 528/222;
525/471; 528/223; 528/224; 525/474; 528/226;
528/228; 525/534; 528/229; 528/373; 525/535;
528/374; 528/375; 525/538; 528/390; 528/391;
525/539; 525/540; 528/5; 528/6; 528/7;
528/12; 528/20; 528/21; 528/22; 528/23;
528/27; 528/28; 528/30; 528/33; 528/48;
528/51; 528/52; 528/68; 528/70; 528/73;
528/79; 528/85; 528/125; 528/126
[58] Field of Search ...................... 528/48, 51, 52, 68,
528/73, 79, 168, 205, 210, 211, 5, 6, 7, 4, 12, 21,
20, 23, 22, 70, 85, 373, 390, 391, 374, 375, 30,
27, 28, 33, 172, 125, 126, 128, 220, 222, 223,
224, 226, 228, 229; 525/452, 453, 459, 471, 474,
534, 535, 538, 539, 540

[56] References Cited

U.S. PATENT DOCUMENTS 3,657,186 4/1972 Craven .................................. 528/210
3,674,749 7/1972 Craven .................................. 528/73

Primary Examiner—Lester L. Lee
Attorney, Agent, or Firm—Steinberg & Blake

[57] ABSTRACT

A thermostable heterocyclic polymer constituted by monomer units of the general formula

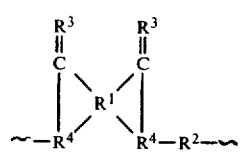

where $R^1$ and $R^2$ denote an organic radical having from 2 to 1000 carbon atoms;
a radical having 2 to 1000 carbon atoms, containing:
1 to 1000 atoms of Si,
and/or 1 to 1000 atoms of F,
and/or 1 to 1000 atoms of Cl,
and/or 1 to 1000 atoms of Br,
and/or 1 to 1000 atoms of N,
and/or 1 to 1000 atoms of S,
and/or 1 to 1000 atoms of P,
and/or 1 to 1000 atoms of B,
and/or 1 to 1000 atoms of O, $R^1$ and $R^2$ being either the same or different;

$R^3$=NH, CH$_2$;

$R^4$ is a radical which, with $R^3$=NH, may be

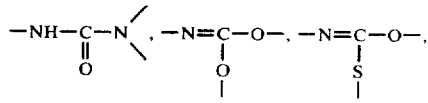

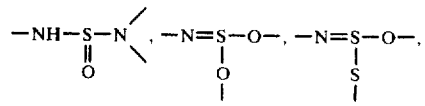

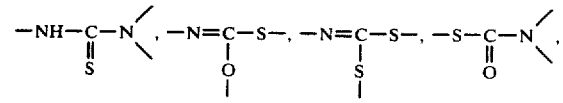

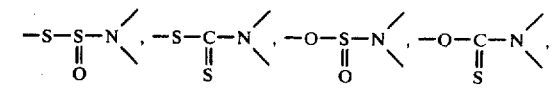

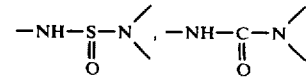

while with $R^3$=CH$_2$ said radical may be

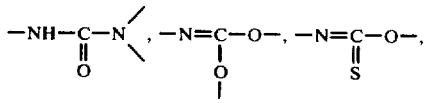

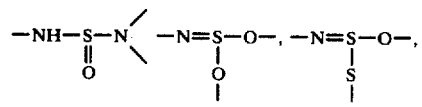

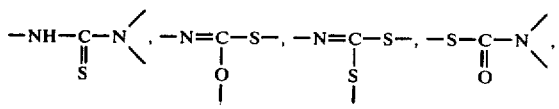

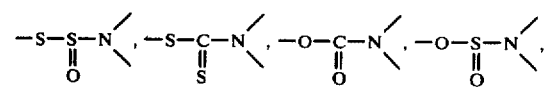

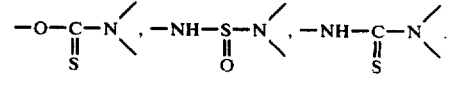

8 Claims, No Drawings

THERMOSTABLE NITROGEN CONTAINING HETEROCYCLIC POLYMERS AND PROCESS FOR PRODUCING

The present invention relates to thermostable heterocyclic polymers and a process for producing same.

FIELD OF THE INVENTION

The aforesaid polymers find extensive application for making a variety of materials which are used in, say, aircraft and space engineering, atomic industry, electrical engineering, mechanical engineering. Such materials are operable at such elevated temperatures as 300° to 400° C.

BACKGROUND OF THE INVENTION

A broad spectrum of materials is known at present to be based upon thermostable heterocyclic polymers.

However, only finished polymers are employed for making such materials. Initial monomers cannot be used immediately for making the above materials because the process of their transformation into polymers is accompanied either by evolution of by-products (such as $H_2O$, $CO_2$, $NH_3$) which considerably deteriorate the characteristics of the material, or by formation of structures that feature a prolonged thermooxidative stability at low temperatures not over 200° to 250° C. That is why use is made, for making high thermostable materials featuring best characteristics, of finished polymers which are produced by the processes of synthesis, isolation and purification, whereas the material (such as molding material) is produced by polymer processing. The presence of additional steps (synthesis, isolation and purification of the resultant polymer) substantially sophisticates production of the material, adds to the cost thereof, and requires more production areas. At the same time the stages of synthesis, isolation and purification of polymers can be obviated through the application of such starting reagents the reaction of which is not accompanied by evolution of any by-products and yields polymers featuring high thermal and thermooxidative stability.

In such case the polymer production process may be carried out concurrently with the polymer material manufacturing process. The reagents possessing the abovesaid characteristics are such as bis-orthoaminonitriles and bis-orthohydroxynitriles which in reacting with polyfunctional isocyanates form thermostable polymers of the heterocyclic structure, said reaction of bis-orthoaminonitriles or bis-orthohydroxynitriles with polyfunctional isocyanates being run at 130° to 300° C. within 1 to 24 hours. With a view to producing homogeneous mixtures based upon crystalline reagents featuring high melting points, it is recommended to carry out short-time heating of the reagents in the presence of a solvent, such as toluene, xylene, methylethylketone, acetone, tetrahydrofuran, ethyleneglycol dimethyl hydrine, chloroform, followed by extraction of the solvent by drying the mixture at a temperature up to 130° C. The resultant homogeneous mixtures can be used as, for example, adhesives. The solution, containing bis-orthoaminonitrile or bis-orthohydroxynitrile, polyfunctional isocyanate and a solvent, can also be used for impregnating glass-, carbon- or polyamide-fiber cloth, followed by evaporation of the solvent. Various additives may be added to the mixtures based on said reagents, such as antioxidants, pigments, dyes, other polymers, resins), as well as other reagents capable of reacting with bis-orthoaminonitriles, bis-orthohydroxynitriles and polyisocyanates (diamines, diols, dithiols, isothiocyanates).

However, as tests have demonstrated, polymers resulting from said reagents feature a relatively low thermal stability and therefore are capable of long-term service at temperatures not exceeding 250° to 270° C.

SUMMARY OF THE INVENTION

It is an object of the present invention to provide thermostable heterocyclic polymers that exhibit long-time thermal stability when exposed to temperatures on the order of 300° to 350° C.

It is another object of the present invention to provide a process for producing said polymers.

In keeping with said and other objects the invention provides thermostable heterocyclic polymers that are composed of units of the general formula

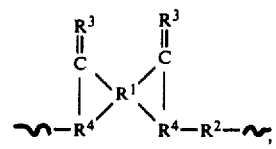

where $R^1$ and $R^2$ denote an organic radical having from 2 to 1000 carbon atoms;

a radical having from 2 to 1000 carbon atoms, containing:
  1 to 1000 atoms of Si,
  and/or 1 to 1000 atoms of F,
  and/or 1 to 1000 atoms of Cl,
  and/or 1 to 1000 atoms of Br,
  and/or 1 to 1000 atoms of N,
  and/or 1 to 1000 atoms of S,
  and/or 1 to 1000 atoms of P,
  and/or 1 to 1000 atoms of B,
  and/or 1 to 1000 atoms of O, $R^1$ and $R^2$ being either the same or different;
$R^3$=NH, $CH_2$;
$R^4$ is a radical which (with $R^3$=NH) may be

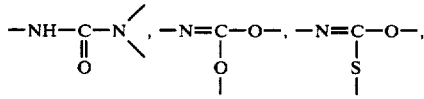

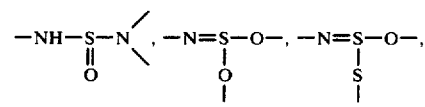

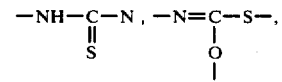

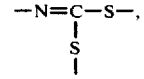

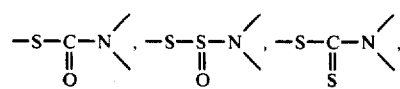

-continued

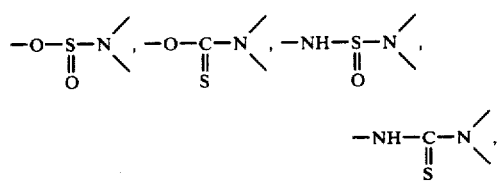

while with $R^3=CH_2$ said radical may be as

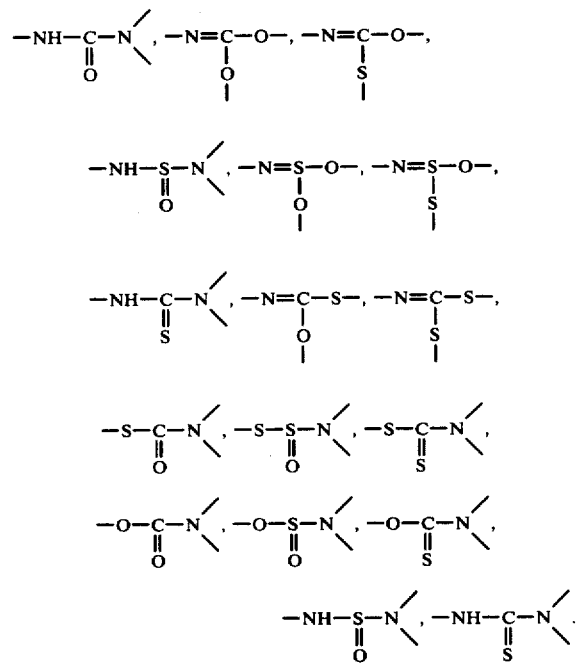

According to the invention, a process for producing said polymers resides in that compounds containing nitrile and/or ethynyl groups are made to react at 90° to 400° C., said groups having the general formula $$X_n-R^1-Y_m$$

where
X=CN, CCH;
Y=NH$_2$, OH, SH, NCO, NSO, NCS;
X is in the alpha-, beta-, ortho-, or peri-position with respect to Y;
n>1;
m>1;
$R^1$ is an organic radical containing from 2 to 1000 carbon atoms;
a radical having from 2 to 1000 carbon atoms, containing
1 to 1000 atoms of Si,
and/or 1 to 1000 atoms of F,
and/or to 1000 atoms of Cl,
and/or 1 to 1000 atoms of Br,
and/or 1 to 1000 atoms of N,
and/or 1 to 1000 atoms of S,
and/or 1 to 1000 atoms of P,
and/or 1 to 1000 atoms of B,
and/or 1 to 1000 atoms of O,
with polyfunctional compounds of the general formula $$R^2-Z_p$$

where
$R^2$ is an organic radical containing from 2 to 1000 carbon atoms;
a radical having from 2 to 1000 carbon atoms, containing
1 to 1000 atoms of Si,
and/or 1 to 1000 atoms of F,
and/or 1 to 1000 atoms of Cl,
and/or 1 to 1000 atoms of Br,
and/or 1 to 1000 atoms of N,
and/or 1 to 1000 atoms of S,
and/or 1 to 1000 atoms of P,
and/or 1 to 1000 atoms of B,
and/or 1 to 1000 atoms of O;
Z=NH$_2$, OH, SH, NCO, NSO, NCS, so that
with X=CN and Y=NH$_2$, OH, Z may be NSO, NCS;
with X=CN and Y=SH, Z may be NSO, NCS, NCO;
with X=CN, CCH and Y=NCO, NSO, NCS, Z may be NH$_2$, OH, SH;
with X=CCH and Y=NH$_2$, OH, SH, Z may be NCO, NCS, NSO;
p≧2, $R^1$ and $R^2$ being either the same or different.
$R^1$ may be selected from, say, the group consisting of

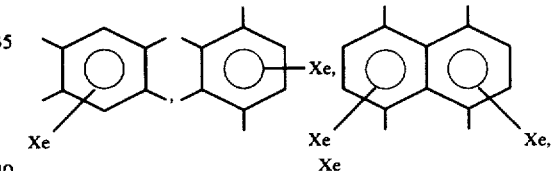

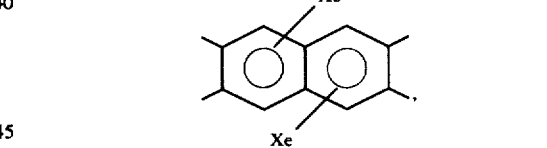

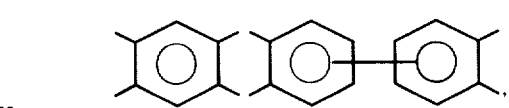

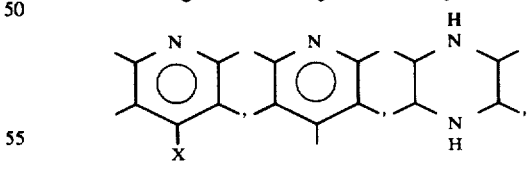

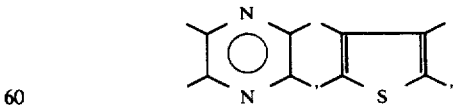

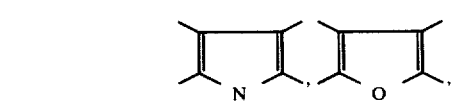

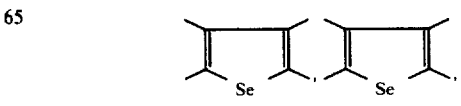

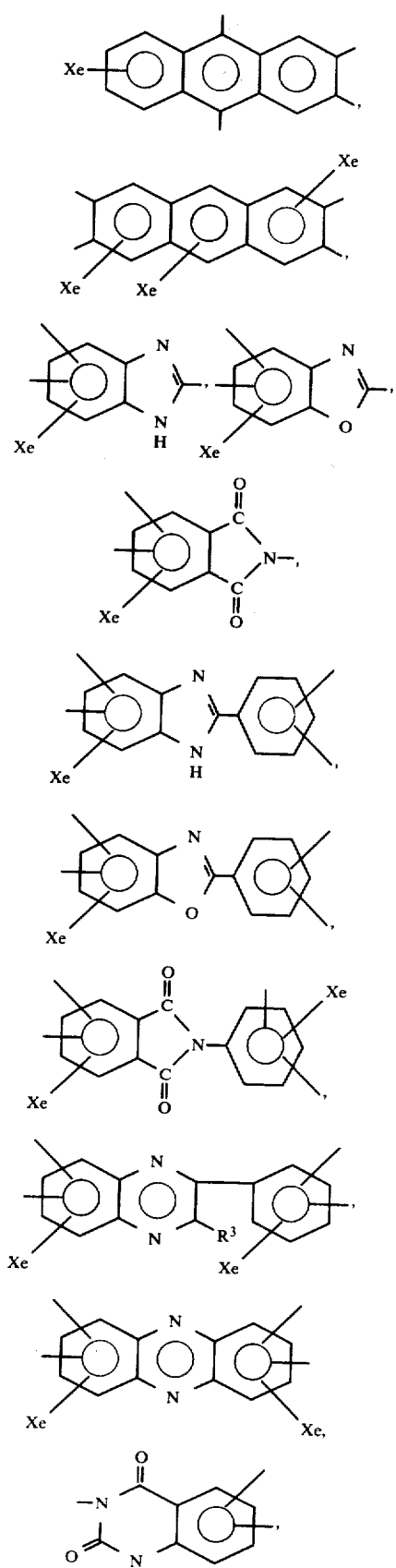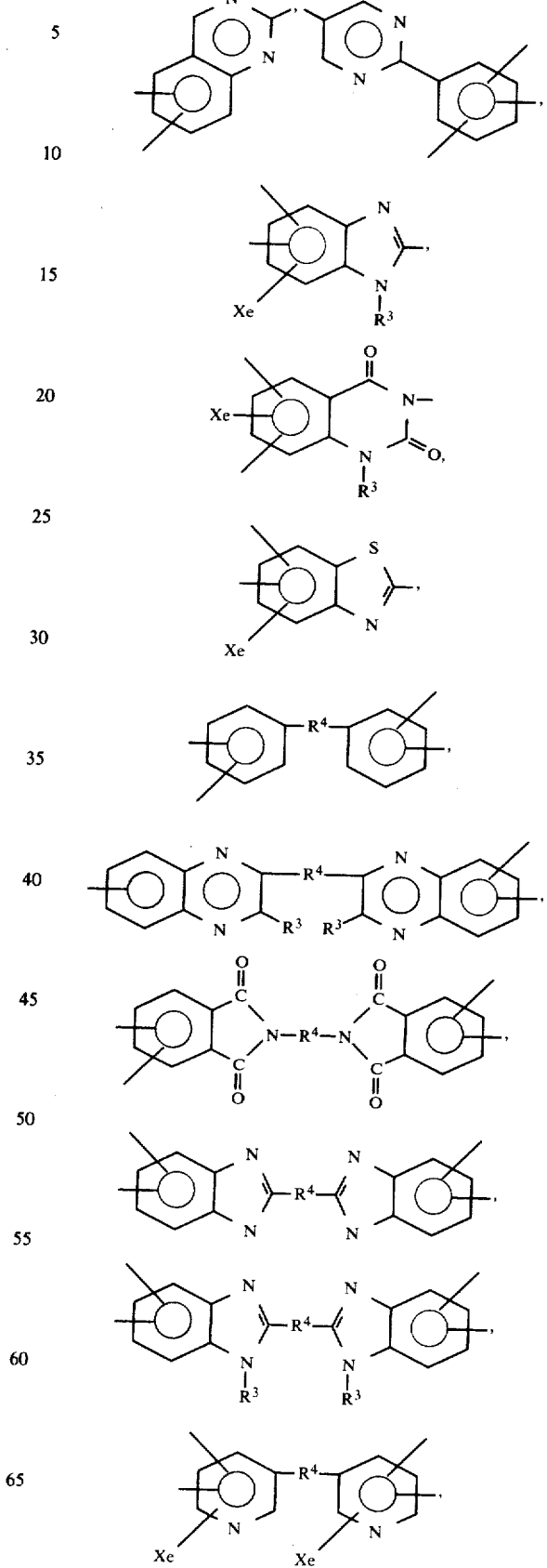

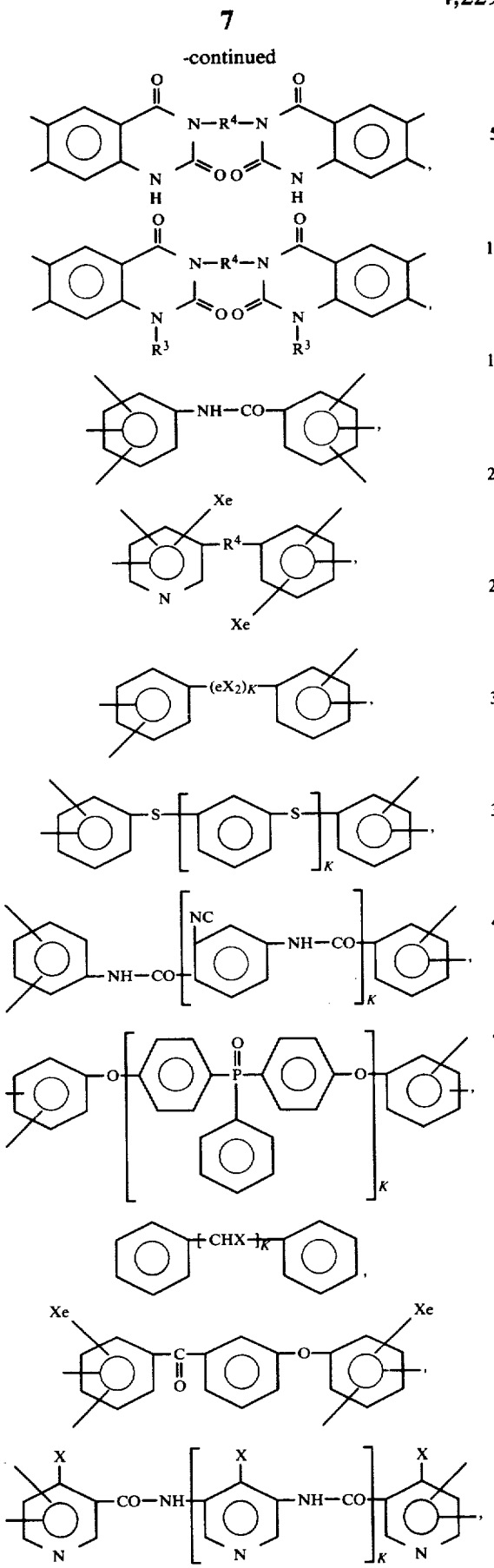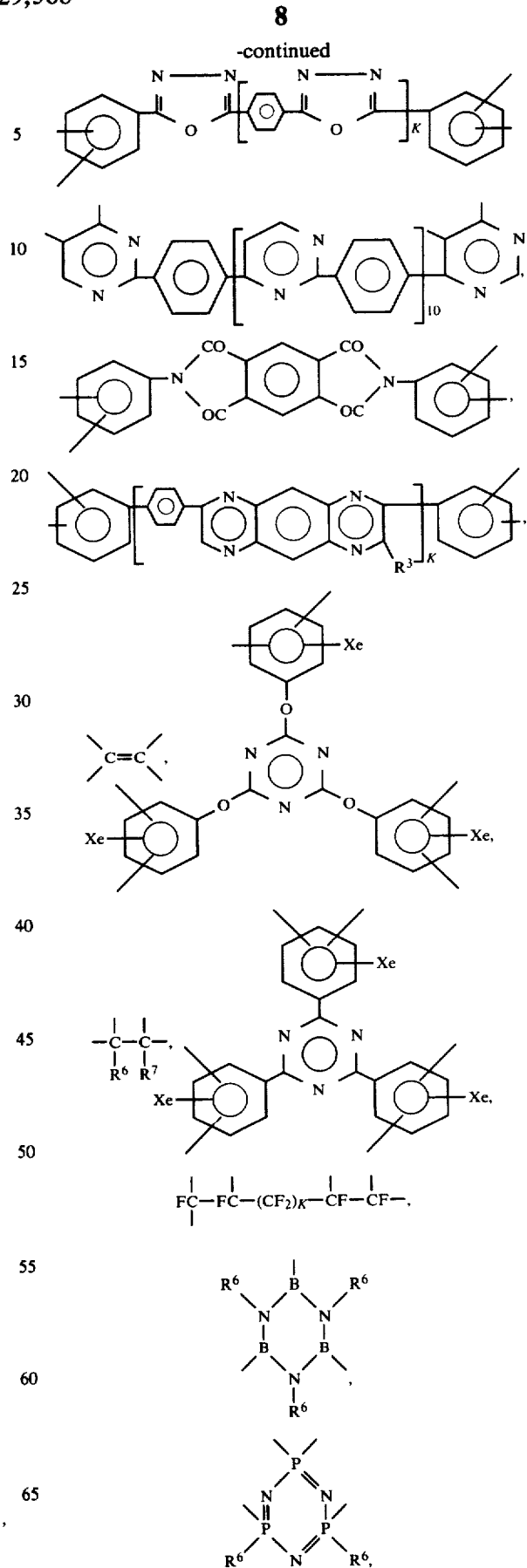

-continued

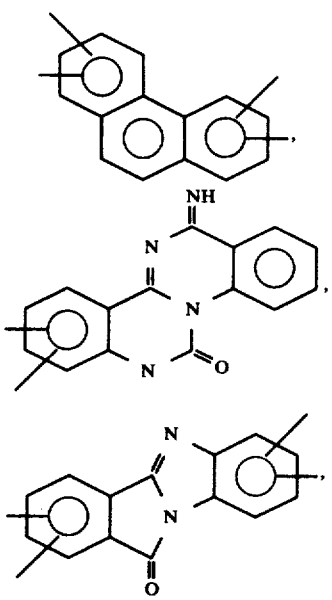

where R⁴ is selected from the group consisting of alkylene radicals having from 1 to 6 carbon atoms,

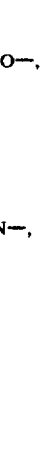

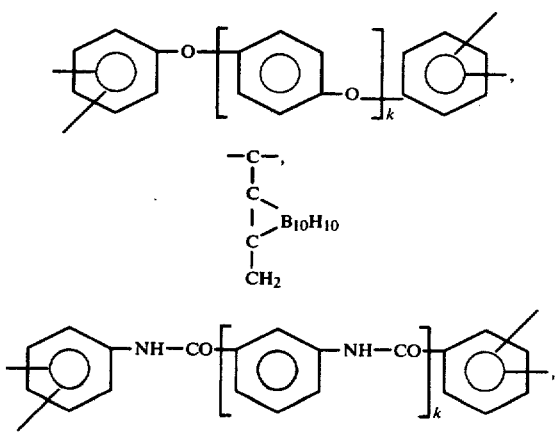

-continued

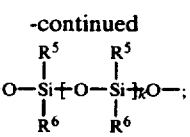

X = H, F, Cl, Br;
R³, R⁵, R⁶—$C_lH_{2l+1}$, $C_lH_{2l-1}$, $C_lX_{2l-q+1}$,

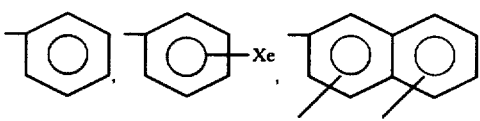

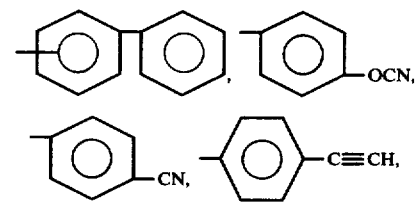

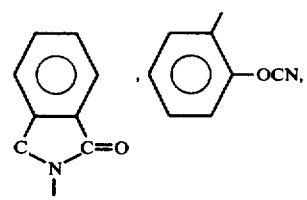

$l = 1 \div 2$, $K = 1 \div 1000$, $q = 1 \div 10$, $t = 1 \div 5$.

It is preferred that the compounds containing nitrile and/or ethynyl groups react with said polyfunctional compounds either in the atmosphere of an inert gas or under vacuum so as to obviate the oxidative effect of atmospheric oxygen upon the reaction components and upgrade the quality of the resultant polymer.

It is also practical to have the compounds containing nitrile and/or ethynyl groups react with said polyfunctional compounds in the presence of a solvent which could further be removed by drying in air, in a stream of inert gas or under vacuum, the rate of the drying process being the highest in the latter case. Application of a solvent not only contributes to a more homogeneous reaction mixture but also promotes the reaction between the components. Provision of a solvent renders the reaction mixture more processable; in particular, use of a solvent facilitates impregnation of the filler and improves mouldability of the reaction mixture. Curing the reaction mixture in the presence of a solvent followed by the removal of the solvent by drying enables the production the polymer product as a homogeneous fine-pore solid matter.

As a solvent use can be made of the following compounds: acetone, methylethylketone, pyridine, acetonitrile, acrylonitrile, N,N-dimethylformamide, N,N-dimethylacetamide, N-methylpyrrolidone, tetrahydrofuran, toluene, xylene, chloroform, dimethylsulphoxide, hexamethylphosphortriamide, or mixtures thereof, as well as some other substances or mixtures thereof, possessing dissolving capacity with respect to the compounds containing nitrile and/or ethynyl groups, and to said polyfunctional compounds.

Higher rate of reaction of the compounds containing nitrile and/or ethynyl groups and said polyfunctional compounds is attained through application of various catalysts. Used is particularly made of triethylamine, N,N-diethylaniline, ethylacetate, diethyl ether. Catalytic effect is produced also by some of the aforesaid solvents, such as pyridine, N,N-dimethylformamide, N,N-dimethylacetamide, hexamethylphosphortriamide.

Characteristics of polymers, and particularly their thermal stability depend upon the structure of the starting monomers. As stated above, bis-orthoaminonitriles and bis-orthohydroxynitriles employed for, reacting with polyfunctional isocyanates give polymers capable of retaining stability only at temperatures not exceeding 250° to 270° C., whereas some fields of present-day engineering require polymers remaining stable when exposed to more elevated temperature for a prolonged period of time.

Polymers produced according to the present invention feature thermal stability at 300° to 350° C. and even higher temperatures.

The resultant polymers have been assessed according to IR-spectra, losses of their mass at 300° C., 350° C., 400° C., 450° and 500° C., as well as by the properties of the moulding materials based thereon.

Thus, to give an example, the interaction of 2.1 g of the compound of the formula

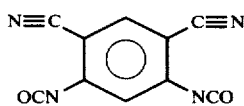

with 5 g of the compound of the formula

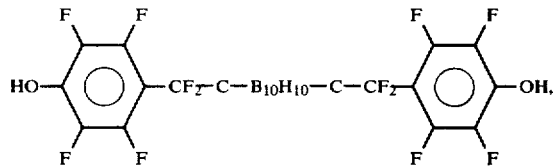

upon heating the mixture of said compounds in an atmosphere or argon within one hour up to 240° C. and holding said mixture at that temperature within 2 hours, gives a polymer which loses 3 percent of its mass upon having been exposed to a temperarue of 350° C. in air for a period of 10 hours. Under the same conditions a polymer based on 3,3'-dicyan-4,4'-diaminodiphenyl ester and 4,4'-diisocyanatediphenyl ester is found to lose 28 percent of the mass thereof.

Polymers produced according to the instant process, both per se and with the solvent, are suitable for making, by conventional techniques, a variety of materials, such as fabric-reinforced laminates, moulding materials, adhesives, abrasive tools, surface coatings, filters. Such materials are capable of retaining their physico-mechanical and dieletric characteristics at high temperatures as high as 300° to 400° C. and higher.

The process for producing said polymers makes it possible, whenever necessary, to combine the polymer synthesis process with the process for making an article based thereon, thus obviating the polymer isolation and purification stages.

DETAILED DESCRIPTION OF THE INVENTION

The process of the invention is technologicaly simple and is carried into effect as follows.

Compounds containing nitrile and/or ethynyl groups, or a mixture of such compounds are thoroughly mixed with a corresponding polyfunctional compound, or a mixture of polyfunctional compounds. The resultant reaction mixture is heated to 90°–400° C. The components used in carrying out said reaction, may be taken at once in the required amount or be added to the reaction mixture in parts within the interaction period. It is preferable to conduct the reaction in the atmosphere of an inert gas, such as argon, or under vacuum. The reaction may also be conducted in the presence of, for example, an organic solvent or a catalyst. Once the reaction mixture has been heated at 90° to 400° C. a solid polymer substance results that can be immediately used for the required purpose.

For a better understanding of the present invention the following examples of its practical embodiment are given below by way of illustration.

EXAMPLE 1

3.0 g of the compound of the formula

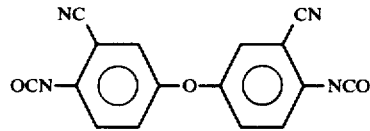

and 2.0 g of the compound having the formula

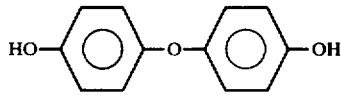

are thoroughly mixed together and placed in a flask purged with argon. Then the mixture is heated to 200° C. for 1.5 hours and held at that temperature within 1 hour. Thereupon the mixture is held at 250° C. for another 0.5 hour, and at 300° C. for one more 0.5 hour. The result is a solid brown-coloured polymer of the formula

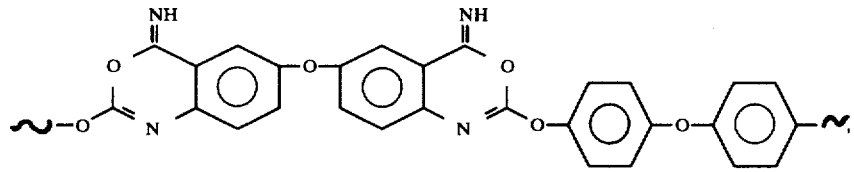

the yield being 98.5 percent. IR-spectroscopy measurements have demonstrated the reaction performed to completely eliminate the absorption bands in the region of 2230 to 2240 cm$^{-1}$, corresponding to vibrations of the isocyanate and nitrile groups.

EXAMPLE 2

4.84 g of the compound of the formula

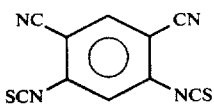

and 14.72 g of the compound having to the formula

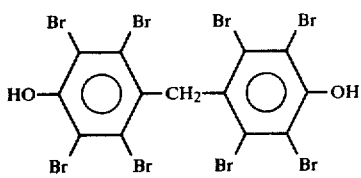

are dissolved in 50 ml of acetonitrile. The resultant solution is heated in atmospheric air at 50° C. for 2 hours, at 120° C. for 3 hours and at 250° C. for 6 hours. The result is a brown-coloured polymer having the formula

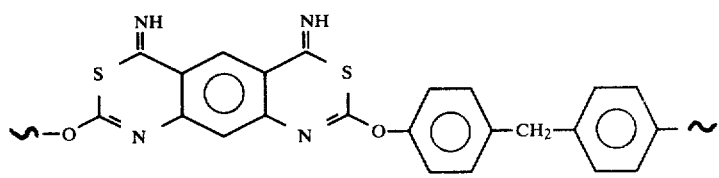

The yield is 99 percent. The thus-obtained polymer is found to lose 2.2 percent of its mass on being held at 300° C. in air for 50 hours. The polymer neither burns nor sustains burning.

EXAMPLE 3

5.0 g of the compound having the formula

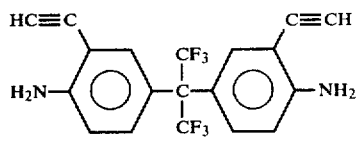

and 3.7 of the compound having the formula

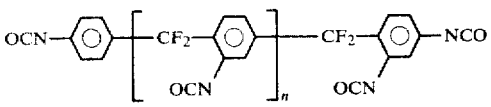

where $n=6$, are thoroughly mixed together and placed in a flask purged with nitrogen. The mixture is heated to 180° C. for one hour and kept at that temperature for another hour, and at 270° C. for one hour to obtain a solid cross-linked light-brown coloured polymer insoluble in any organic solvent. IR spectra of said polymer lack the absorption bands characteristic of vibrations of the ethynyl and isocyanate groups. The polymer does not melt up to a temperature at which an intense decomposition commences, which, according to the evidence of thermogravimetric analysis carried out in an argon atmosphere at a rate of 6° per minute, is found to be at 430° C.

EXAMPLE 4

3.0 g of the compound having the formula

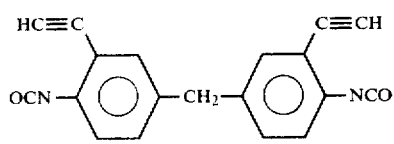

and 3,3 g of the compound having the formula

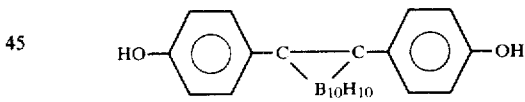

are dissolved along with 1.2 ml triethylamine in 70 ml of dimethylacetamide. The resultant solution is allowed to stand for one hour at 50° C. in an argon atmosphere. The result is a polymer of the formula

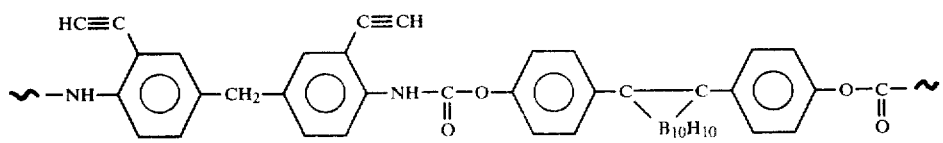

which is then isolated from the reaction mixture by precipitating in 500 ml of water. The precipitated polymer is washed with water and acetone and dried under a 10-mm Hg vacuum at 40° C., whereupon the polymer is subjected to cyclization at 300° C. in a nitrogen atmosphere to obtain a polymer of the formula

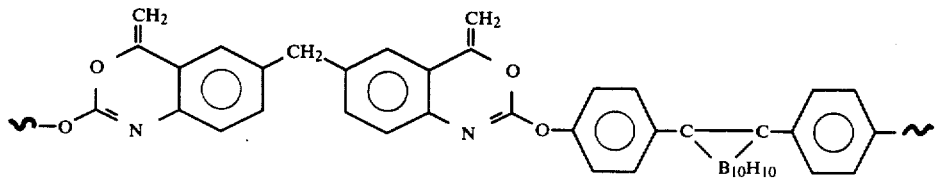

The yield of the end product equals 90 percent. The thus-obtained polymer is found to lose 12 percent of its mass after having been allowed to stand at 350° C. in air for 300 hours. The compression strength of moulding material made from said polymer is 1050 kgf/cm² at 380° C. and under a pressure of 700 kgf/cm², and 480 kgf/cm² at 20° and 300° C., respectively.

EXAMPLE 5

11.3 g of the compound having the formula

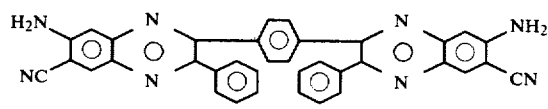

and 6.2 g of the compound having the formula

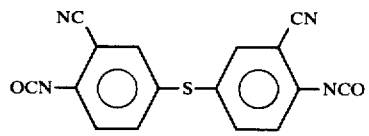

are dissolved in 50 ml of acetone, the resulting solution is placed in a flask purged with argon and is allowed to stand at 20° C. for 24 hours, at 50° C. for one hour, and at 100° C. for another hour. The resultant polymer is a yellowish block which is found, according to the IR spectroscopy data, to contain both fragments of the carbamide structure

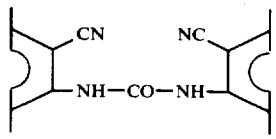

and fragments undergone cyclization having the formula

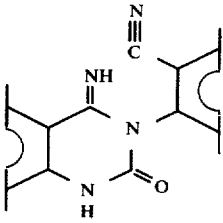

After having been heated at 240° C. within an hour said block turns into a bright-yellow coloured polymer which is found, according to the IR spectroscopy data, to be free from fragments of the carbamide structure. According to the thermogravimetric analysis data (6°/min., air), the polymer is found to lose 10 percent of its mass at 500° C. The resultant block features a compression strength of 300 and 150 kgf/cm² at 20° C. and 350° C., respectively.

EXAMPLE 6

0.1 g of the compound having the formula

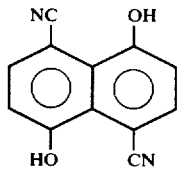

and 50 g of the compound having the formula where $n=1000$, are dissolved in a mixture of 60 ml of N-methylpyrrolidone and 5 ml of pyridine. The resulting solution is placed in an argon-purged flask and is heated at 100° C. for 5 hours, whereupon the thus-obtained viscous solution is made to precipitate in acetone, the isolated yellowish product being washed with acetone to obtain 50.08 g of a polymer having the following structure (according to the IR spectroscopy data)

After having been heated at 270° C. for one hour, the polymer powder turns into a polymer which does not display absorption bands corresponding to the groups —CN, —NH—CO—O—.

The fact that IR spectra also do not display absorption bands characteristic of triazine structures evidences that the produced polymer has the following structure

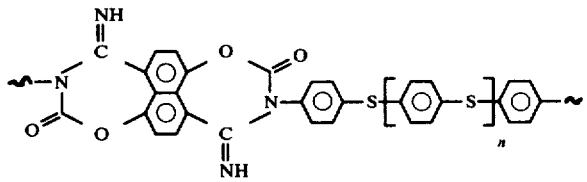

A specimen is moulded from the thus-obtained polymer at 360° C. said specimen featuring a compression strength of 600 and 200 kgf/cm² at 20° C. and 200° C., respectively. The specimen is found to lose 3 percent of its mass upon being exposed to 300° C. for 100 hours.

EXAMPLE 7

1.34 g of the compound having the structure

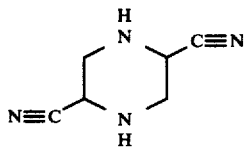

3.33 g of the compound having the structure

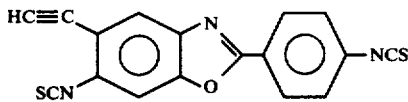

and 2.51 g of the compound having the structure

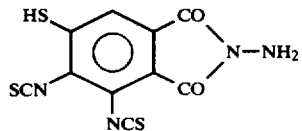

are thoroughly mixed and placed in an argon-purged flask. Then the mixture is heated to 270° C. and allowed to stay at that temperature for 30 minutes to obtain a dark-brown coloured polymer whose IR spectrum does not display absorption bands of the groups —CN, —NH₂, SH, —NCS, and

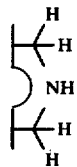

Upon having been heated to 300° C. in air for 25 hours, the product is found to have lost 5 percent of its mass.

The polymer is soluble neither in amide solvents nor in concentrated sulphuric acid.

EXAMPLE 8

3.0 g of the compound having the formulas

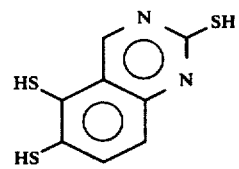

3.5 g of the compound having the formula

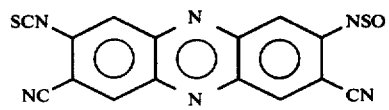

and 3.5 g of the compound having the formula

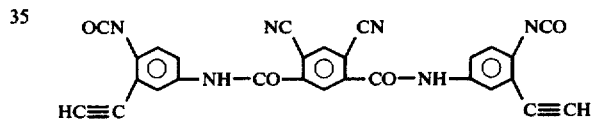

are dissolved in acetone, the solution is heated at 40° C. for 20 minutes, whereupon the resultant product is made to precipitate in heptane. The thus-precipitated product is dried under vacuum, then is heated in a stream of argon at 270° C. for 30 minutes to obtain a dark-brown coloured powderlike polymer mouldable at 400° C. and under a pressure of 300 kgf/cm². The IR spectrum of the finished product does not display absorption bands characteristic of the groups —NCO, CN, —SH, —NCS and NSO.

When exposed to heating in air for 50 hours at 350° C., the polymer is found to lose 6 percent of its mass.

EXAMPLE 9

30 g of the compound having the formula

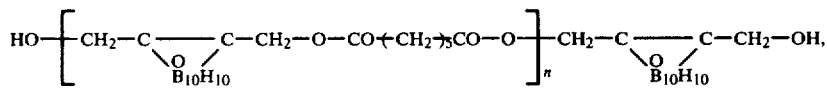

n = 20

1.5 g of the compound having the formula

[Structure: bis(phenyl-methyl-siloxane) with OSN, NC, CN substituents on terminal phenyl rings]

and 0.8 g of the compound having the formula

[Structure: thiophene with NC, CN, SCN, NCS substituents]

are dissolved in acrylonitrile and the solution is heated in an autoclave at 60° C. for one hour, at 80° C. for another hour and at 120° C. for one more hour. The product thus obtained is vacuum-dried at 50° C. for an hour, at 150° C. for another hour, and at 270° C. for one more hour to obtain a dark-brown coloured polymer which is found to lose 2 percent of its mass after having been treated in air at 300° C. for 100 hours. The product does not soften up to a temperature at which its intense decomposition occurs, said temperature lying within a range from 470° to 500° C. according to the thermogravimetric analysis data (6°/min., air).

EXAMPLE 10

10 g of the compound having the formulas

[Structure: HO–C₆H₃(CN)–O–[C₆H₄–P(=O)–C₆H₄–O]ₙ–C₆H₃(CN)–OH]

where n=50, 0.02 g of the compound having, the formula

[Structure: benzimidazole with HC≡C, H₂N, NH₂, N-phenyl substituents]

and 0.45 g of the compound having the formula

[Structure: biphenyl bridged by CF₂ group with HC≡C, SCN, C≡CH, NCS substituents]

are thoroughly mixed and placed in an argon-purged flask, whereupon the mixture is heated at 270° C. for 40 minutes to obtain a dark-brown coloured polymer which is found to lose 2.5 percent of its mass after having been exposed to thermal ageing in air at 300° C. for 100 hours.

EXAMPLES 11 THROUGH 44

Following the procedure described in Example 10 polymers are obtained, based on the starting components. The composition of the reaction mixture is given in Table 1 in which the conditions of thermal ageing and the data on losses in mass in the course of thermal ageing of the polymer products produced are also specified.

EXAMPLES 45 THROUGH 59

A mixture of monomers stated in Example 44, taken in an amount of 0.4 g. is mixed with a solvent, and the resultant mixture is heated first in a closed vessel, then under a 1-2 mm Hg vacuum. The data on the solvents used and temperature conditions are specified in Table 2 which contains also the data on losses in mass of the resultant polymers when exposed to thermal ageing in air.

TABLE 1

| No. of Example | Composition of reaction mixture | Molar ratio of components | Atmosphere | Conditions of thermal ageing Temperature °C. | Exposure time, h | Losses in mass, wt. % |
|---|---|---|---|---|---|---|
| 1 | 2 | 3 | 4 | 5 | 6 | 7 |
| 11 | [Structures: pyridine with HO, OH, HC≡C, C≡CH substituents; pyridine with HO, OH, NC, CN, NH substituents; phenol with OH, CN; and OSN–C₆H₄–P(=O)(CF₃)–C₆H₄–NSO] | 0.9:0.1:0.02:1 | air | 400° | 20 | 12 |

TABLE 1-continued

| No. of Example 1 | Composition of reaction mixture 2 | Molar ratio of components 3 | Atmosphere 4 | Temperature, °C. 5 | Exposure time, h 6 | Losses in mass, wt. % 7 |
|---|---|---|---|---|---|---|
| 12 | [structure] | 1:1 | air | 350 | 10 | 6 |
| 13 | [structure] | 1:1:0.05 | air | 300 | 50 | 5 |
| 14 | [structure, n = 185] | 1:1 | air | 300 | 50 | 7 |
| 15 | [structure] | 1:3:5 | argon | 450 | 50 | 14 |
| 16 | [structure] | 1:1 | air | 300 | 100 | 1,3 |

TABLE 1-continued

| No. of Example 1 | Composition of reaction mixture 2 | Molar ratio of components 3 | Conditions of thermal ageing | | | |
|---|---|---|---|---|---|---|
| | | | Atmosphere 4 | Temperature, °C. 5 | Exposure time, h 6 | Losses in mass, wt. % 7 |
| 17 | [structures shown] | 4:200 | air | 300 | 100 | 3 |
| 18 | [structures shown] | 10:2 | argon | 300 | 500 | 1.5 |
| 19 | [structures shown] | 1:1 | argon | 300 | 50 | 3 |
| 20 | [structures shown] | 1:1.2 | nitrogen | 350 | 100 | 7 |
| 21 | [structures shown] | 1:5:7 | air | 300 | 1000 | 2.3 |

TABLE 1-continued
|  |  |  | Conditions of thermal ageing | | |
|---|---|---|---|---|---|
| No. of Example 1 | Composition of reaction mixture 2 | Molar ratio of components 3 | Atmosphere 4 | Temperature, °C. 5 | Exposure time, h 6 | Losses in mass, wt. % 7 |
| No. of Example | Composition of reaction mixture | Molar ratio of components | Atmosphere | Temperature, °C. | Exposure time, h | Losses in mass, wt. % |
|---|---|---|---|---|---|---|
| 22 | 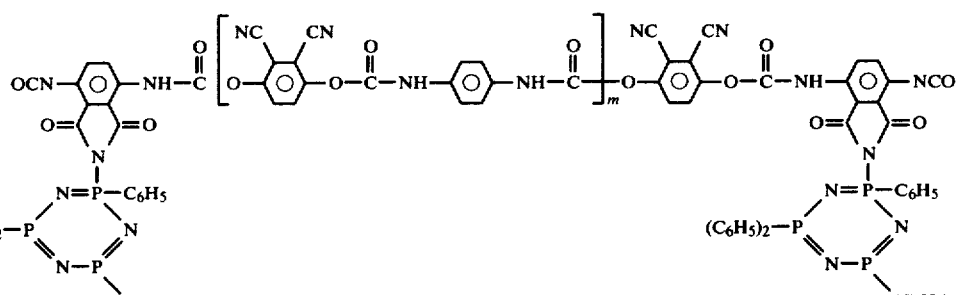 | 1:1:1 | argon | 500 | 20 | 27 |
| 23 | 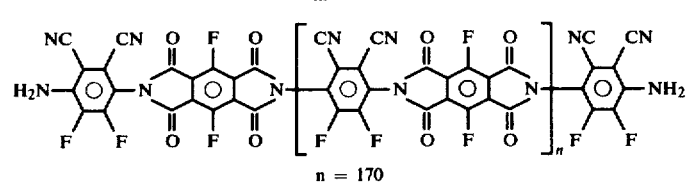 | 3:2 | air | 300 | 100 | 3 |
| 24 | 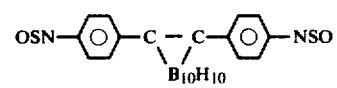 | 1:2 | air | 300 | 500 | 7 |
| 25 | 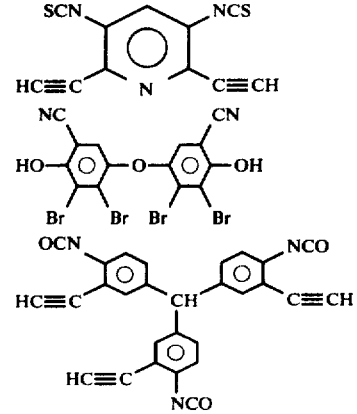 | 1:1:2 | air | 400 | 10 | 20 |

TABLE 1-continued

| No. of Example 1 | Composition of reaction mixture 2 | Molar ratio of components 3 | Atmosphere 4 | Temperature, °C. 5 | Exposure time, h 6 | Losses in mass, wt. % 7 |
|---|---|---|---|---|---|---|
| 26 | [structures shown] | 1:0,02 | air | 300 | 1000 | 10 |
| 27 | [structures shown] n = 100 | 2:1 | nitrogen | 300 | 1000 | 0,5 |
| 28 | [structures shown] | 1:50 | air | 300 | 1000 | 11 |
| 29 | [structures shown] n = 290 | 1:0,8 | air | 350 | 10 | 2 |
| 30 | [structures shown] | 1:1:2 | air | 350 | 100 | 18 |

TABLE 1-continued
| No. of Example | Composition of reaction mixture | Molar ratio of components | Atmosphere | Temperature, °C. | Exposure time, h | Losses in mass, wt. % |
|---|---|---|---|---|---|---|
| 1 | 2 | 3 | 4 | 5 | 6 | 7 |
| 31 | 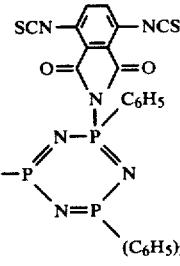 | 1:1 | air | 250 | 5000 | 2 |
| 32 | 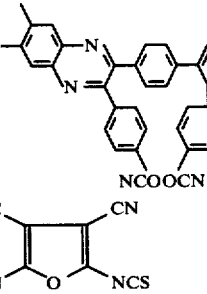 | 2:3 | air | 400 | 10 | 20 |
| 33 | 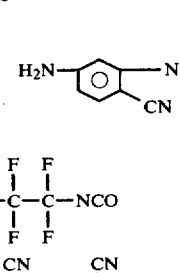 | 1:1:1 | | 300 | 300 | 6 |

TABLE 1-continued
| No. of Example 1 | Composition of reaction mixture 2 | Molar ratio of components 3 | Atmosphere 4 | Temperature, °C. 5 | Exposure time, h 6 | Losses in mass, wt. % 7 |
|---|---|---|---|---|---|---|
| 34 | 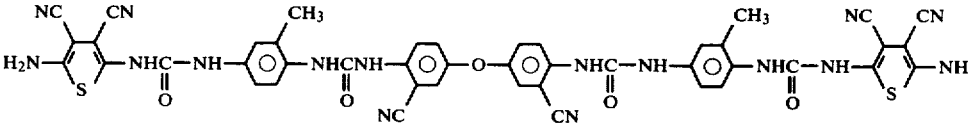 | 1:0.3:1.5 | air | 300 | 100 | 15 |
| 35 | 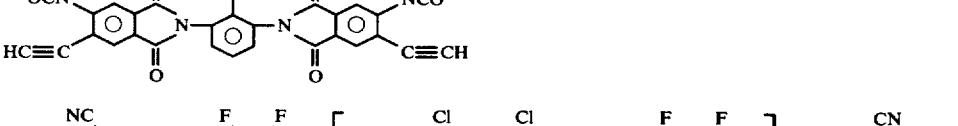 | 1:1 | air | 300 | 1000 | 3.5 |
| 36 | 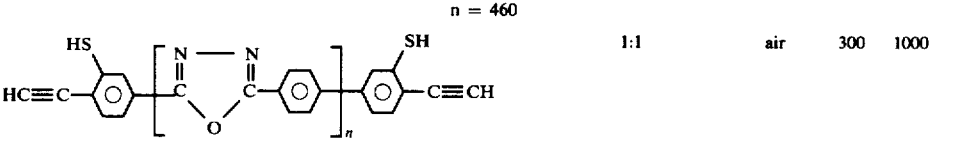 | 1:10 | air | 400 | 2 | 2 |
| 37 | 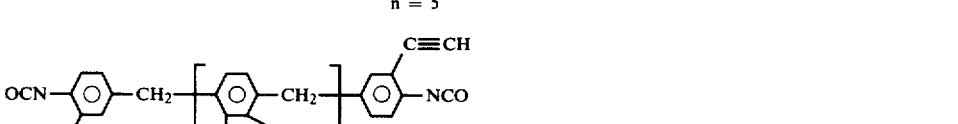 | 1:1 | air | 300 | 100 | 10 |
| 38 |  | 1:1 | air | 400 | 10 | 12 |

TABLE 1-continued

| No. of Example 1 | Composition of reaction mixture 2 | Molar ratio of components 3 | Conditions of thermal ageing | | | |
|---|---|---|---|---|---|---|
| | | | Atmosphere 4 | Temperature, °C. 5 | Exposure time, h 6 | Losses in mass, wt. % 7 |
| 39 | [structure: diamine with HC≡C, CN, CH$_2$, urea linkages, C(CF$_3$)$_2$ bridge, O-B$_{10}$H$_{10}$ carborane groups, phenyl substituents] [structure: pyrimidine with three NSO groups] | 1:2 | air | 370 | 5 | 3 |
| 40 | [polymer structure with NC, CN, OH, urethane/amide linkages, phthalimide and cyclophosphazene (N=P with C$_6$H$_5$ and (C$_6$H$_5$)$_2$ substituents) groups, n = 340] | 100:2:0.01 | air | 450 | 1 | 20 |
| 41 | [structure: SCN—C$_6$H$_4$—S—[C$_6$H$_3$(NCS)—S]$_n$—C$_6$H$_4$—NCS, n = 50] [structure: tetrabromophenyl isocyanate] [structure: HC≡C—C(OH)—CF—CF$_2$—CF—C(OH)—C≡CH] | 1:1 | air | 400 | 10 | 5 |
| 42 | SCN—(CF$_2$)$_5$—NCS [structure: bis(mercapto-ethynylphenyl) disulfide with HS, C≡CH groups] | 1:1 | air | 300 | 100 | 14 |
| 43 | [structure: OSN—oxadiazole—NHCO—O—C$_6$H$_4$—C(CH$_3$)$_2$—C$_6$H$_4$—O—CONH—oxadiazole—NHCO—O—C$_6$H$_4$—C(CH$_3$)$_2$—C$_6$H$_4$—O—CONH—oxadiazole—NSO] [structure: HS, SH, NC, CN substituted furan] [structure: OCN—C$_6$H$_3$(CN)—CH$_2$—C$_6$H$_3$(CN)—NCO] | 1:1 | air | 350 | 50 | 5 |

TABLE 1-continued

| No. of Example | Composition of reaction mixture | Molar ratio of components | Conditions of thermal ageing | | | |
|---|---|---|---|---|---|---|
| | | | Atmosphere | Temperature, °C. | Exposure time, h | Losses in mass, wt. % |
| 1 | 2 | 3 | 4 | 5 | 6 | 7 |
| 44 | 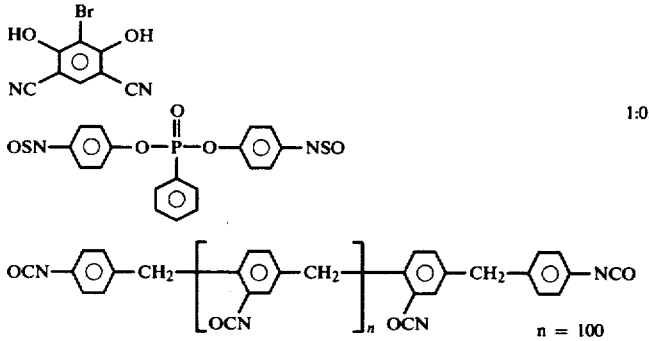 | 1:0.7:0.01 | air | 400 | 5 | 6 |

TABLE 2

| No. of Example | Solvent used | Amount of solvent, ml | Curing temperature of reaction mixture, °C. | | Losses in mass in air at 300° C. for 100 h, wt. % |
|---|---|---|---|---|---|
| | | | in the air | under vacuum | |
| 1 | 2 | 3 | 4 | 5 | 6 |
| 45 | Acetone | 5 | 40° | 90° | 3 |
| 46 | Methylethylketone | 3 | 70° | 90° | 4 |
| 47 | Acetonitrile | 3 | 90° | 90° | 5 |
| 48 | Acrylonitrile | 3 | 100° | 100° | 7 |
| 49 | N-dimethylformamide | 1.5 | 120° | 100° | 6 |
| 50 | N-dimethylacetamide | 1.5 | 120° | 200° | 4.5 |
| 51 | N-methylpyrrolidone | 1.5 | 160° | 250° | 2 |
| 52 | Tetrahydrofuran | 3 | 40° | 90° | 8 |
| 53 | Toluene | 0.7 | 60° | 200° | 9 |
| 54 | Xylene | 0.7 | 60° | 200° | 9 |
| 55 | Chloroform | 3 | 40° | 100° | 6 |
| 56 | Dimethylsulphoxide | 0.5 | 70° | 180° | 5 |
| 57 | Hexamethylphosphortriamide | 1 | 90° | 200° | 1 |
| 58 | Toluene | 0.6 | 90° | 100° | 2 |
| | Pyridine | 0.6 | | | |
| 59 | Acetonitrile | 0.5 | 40° | 90° | 4 |
| | Chloroform | 3 | | | |

What is claimed is:

1. A thermostable heterocyclic polymer, consisting essentially of units having the general formula

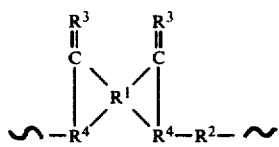

where $R^1$ and $R^2$ denote an organic radical selected from the group consisting of radicals which incorporate from 2 to 1000 carbon atoms and;
a radical selected from the group consisting of radicals which have from 2 to 1000 carbon atoms; said radical containing at least one of the following elements: Si, F, Cl, Br, N, S, P, B, O, each of said elements being present in an amount of from 1 to 1000 atoms;
$R^3$ is a radical selected from the group consisting of NH and, $CH_2$;
$R^4$ is a radical which (with $R^3$=NH) is selected from the group, consisting of

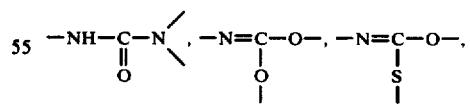

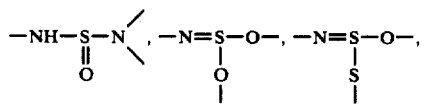

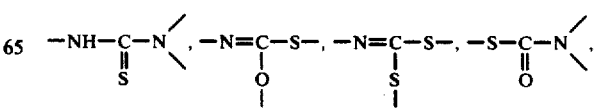

-continued

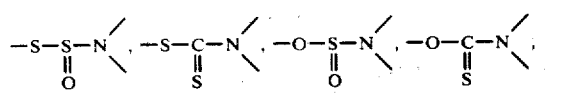

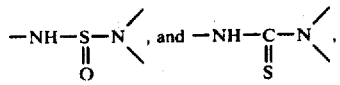

while with R³=CH₂ said radical is selected from the group consisting of

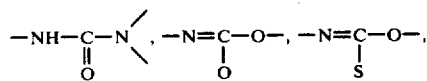

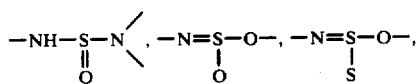

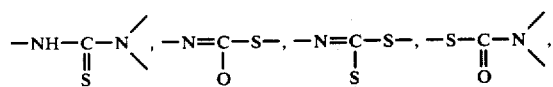

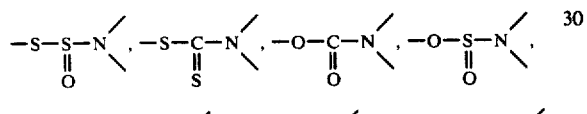

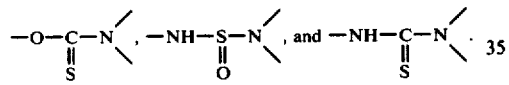

2. A process for producing thermostable heterocyclic polymers, consisting essentially of units of the general formula

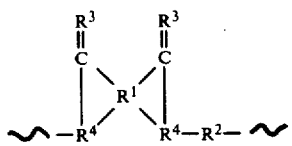

where R¹ and R² stand for an organic radical selected from the group consisting of radicals which have from 2 to 1000 carbon atoms and;
- a radical selected from the group consisting of radicals which have from 2 to 1000 carbon atoms; said radical containing at least one of the following elements: Si, F, Cl, Br, N, S, P, B, O, each of said elements being present in an amount of from 1 to 1000 atoms;
- R³ is a radical selected from the group consisting of NH, and CH₂;
- R⁴ is a radical which (with R³=NH) is selected from the group consisting of

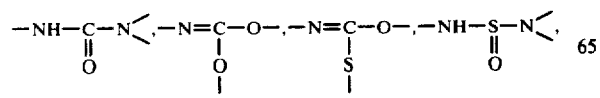

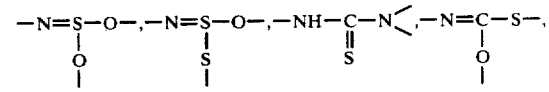

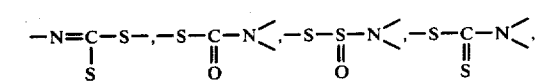

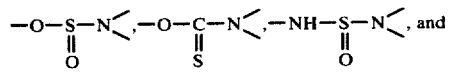

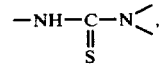

while with R³=CH₂ said radical is selected from the group consisting of

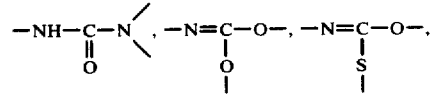

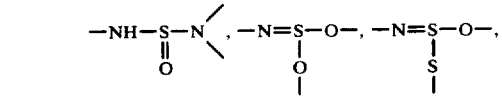

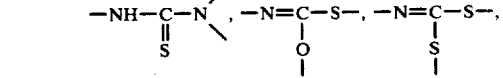

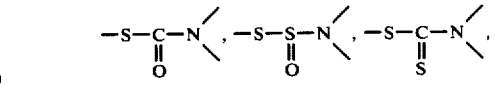

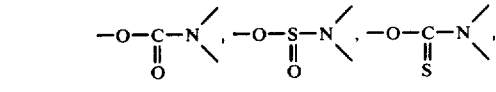

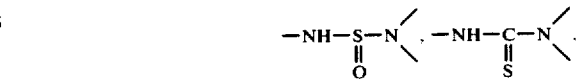

which comprises effecting interaction at a temperature of from 90° to 400° C. between the compounds having the general formula

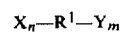

where
- X is a radical selected from the group consisting of CN and CCH;
- Y is a radical selected from the group consisting of NH₂, OH, SH, NCO, NSO, NCS, and X being in the alpha-, beta-, ortho- or peri-position with respect to Y;
- N>1;
- m>1;
- R¹ is an organic radical selected from the group consisting of radicals which have from 2 to 1000 carbon atoms; said radical contains at least one of the following elements: Si, F, Cl, Br, N, S, P, B, O, each of said elements being present in an amount of from 1 to 1000 atoms, with polyfunctional compounds of the general formula $$R^2 - Z_p,$$

where $R^2$ is an organic radical selected from the group consisting of radicals which have from 2 to 1000 carbon atoms; and a radical selected from the group consisting of radicals which have from 2 to 1000 carbon atoms; said radical contains at least one of the following elements: Si, F, Cl, Br, N, S, P, B, O, each of said elements being present in an amount of from 1 to 1000 atoms;

Z is a radical selected from the group consisting of $NH_2$, OH, SH, NCO, NCS, and NSO; with X=CN and Y being a radical selected from the group consisting of $NH_2$ and OH, Z is a radical selected from the group consisting of NSO and NCS; with X=CN and Y=SH, Z is radical selected from the group consisting of NCO, NSO and NCS; with X being selected from the group consisting of CN and CCH, and Y being selected from the group consisting of NCO, NSO and NCS, Z is a radical selected from the group consisting of $NH_2$, OH and SH; with X=CCH and Y being a radical selected from the group consisting of $NH_2$, OH, and SH, Z is a radical selected from the group consisting of NCO, NCS and NSO;

$p \geq 2$.

3. A process as claimed in claim 2, wherein said compounds, containing groups selected from the nitrile and ethynyl groups, are made to react with said polyfunctional compounds in an inert gas atmosphere.

4. A process as claimed in claim 2, wherein said compounds, containing groups selected from the nitrile and ethynyl groups are made to react with said polyfunctional compounds under vacuum.

5. A process as claimed in claim 2, wherein said compounds, containing groups selected from the nitrile and ethynyl groups, are made to react with said polyfunctional compounds in the presence of a solvent.

6. A process as claimed in claim 5, wherein the solvent employed is selected from the group consisting of acetone, methylethylketone, pyridine, acetonitrile, acrylonitrile, N,N-dimethylformamide, N,N-dimethylacetamide, N-methylpyrrolidone-2, tetrahydrofuran, toluene, xylene, chloroform, dimethylsulphoxide, hexamethylphosphortriamide, or a mixture thereof.

7. A process as claimed in claim 2, wherein said compounds, containing groups selected from the nitrile and ethynyl groups, are made to react with said polyfunctional compounds in the presence of a catalyst.

8. A process as claimed in claim 7, the catalyst employed is selected from the group consisting of triethylamine, N,N-dimethylaniline, N,N-diethylaniline, ethylacetate and diethyl ether.

* * * * *